(12) United States Patent
Bordbar et al.

(10) Patent No.: US 12,591,149 B2
(45) Date of Patent: Mar. 31, 2026

(54) MULTIFOCAL DIFFRACTIVE OPHTHALMIC LENSES WITH EVENLY SPACED ECHELETTES

(71) Applicant: Alcon Inc., Fribourg (CH)

(72) Inventors: Behzad Bordbar, Fort Worth, TX (US); Kamal K. Das, Arlington, TX (US)

(73) Assignee: Alcon Inc., Fribourg (CH)

( * ) Notice: Subject to any disclaimer, the term of this patent is extended or adjusted under 35 U.S.C. 154(b) by 618 days.

(21) Appl. No.: 17/804,119

(22) Filed: May 26, 2022

(65) Prior Publication Data

US 2022/0382075 A1 Dec. 1, 2022

Related U.S. Application Data

(60) Provisional application No. 63/194,461, filed on May 28, 2021.

(51) Int. Cl.
G02C 7/04 (2006.01)

(52) U.S. Cl.
CPC ......... G02C 7/044 (2013.01); G02C 2202/20 (2013.01)

(58) Field of Classification Search
CPC ..... G02C 7/044; G02C 2292/20; G02C 7/041
See application file for complete search history.

(56) References Cited

U.S. PATENT DOCUMENTS

| | | | |
|---|---|---|---|
| 7,572,007 B2 | 8/2009 | Simpson | |
| 8,216,307 B2 | 7/2012 | Schaper, Jr. | |
| 9,320,594 B2 | 4/2016 | Schwiegerling | |
| 9,335,564 B2 | 5/2016 | Choi et al. | |
| 10,568,734 B2 | 2/2020 | Mackool | |
| 10,675,146 B2 | 6/2020 | Choi et al. | |
| 2007/0182924 A1 | 8/2007 | Hong et al. | |
| 2009/0088840 A1* | 4/2009 | Simpson | G02C 7/042 |
| | | | 623/6.11 |
| 2009/0268158 A1* | 10/2009 | Weeber | A61F 2/1618 |
| | | | 351/159.73 |
| 2013/0201445 A1* | 8/2013 | Das | A61F 2/1618 |
| | | | 351/159.73 |
| 2013/0293836 A1 | 11/2013 | Weeber | |
| 2015/0022775 A1* | 1/2015 | Ando | G02C 7/049 |
| | | | 351/159.74 |
| 2017/0239038 A1* | 8/2017 | Choi | A61F 2/1618 |
| 2017/0252151 A1* | 9/2017 | Mackool | G02B 5/1895 |
| 2018/0147052 A1* | 5/2018 | Hong | G02B 27/4205 |
| 2022/0043281 A1* | 2/2022 | Weeber | G02C 7/066 |
| 2024/0184138 A1* | 6/2024 | Weeber | A61F 2/1654 |

FOREIGN PATENT DOCUMENTS

| | | |
|---|---|---|
| EP | 2045648 B1 | 4/2012 |
| WO | 0227389 A1 | 4/2002 |

* cited by examiner

*Primary Examiner* — Brandi N Thomas
*Assistant Examiner* — Boutsikaris Leonidas
(74) *Attorney, Agent, or Firm* — Patterson + Sheridan, LLP

(57) ABSTRACT

Certain embodiments described herein are directed to a multifocal ophthalmic lens including a base lens having a base curvature corresponding to a base power, and a diffractive structure comprising a central zone and a plurality of annular echelettes formed on a first surface of the base lens. A radial spacing of each of the plurality of annular echelettes is constant throughout the diffractive structure.

20 Claims, 5 Drawing Sheets

_500_

COMPUTE A STEP HEIGHT, A PHASE DELAY, A CONSTANT RADIAL SPACING OF EACH ECHELLETTE, TO BE FORMED ON A FIRST SURFACE OF A BASE LENS, BASED ON A PREDETERMINED ADD POWER AND A DIAMETER OF THE BASE LENS — 510

FORM THE PLURALITY OF ANNULAR DIFFRACTIVE STEPS ON THE OPHTHALMIC LENS BASED ON THE COMPUTED CONSTANT WIDTH. — 520

MULTIFOCAL DIFFRACTIVE OPHTHALMIC LENSES WITH EVENLY SPACED ECHELETTES

PRIORITY CLAIM

This application claims the benefit of priority of U.S. Provisional Patent Application Ser. No. 63/194,461 titled "MULTIFOCAL DIFFRACTIVE OPHTHALMIC LENSES WITH EVENLY SPACED ECHELETTES," filed on May 28, 2021, whose inventors are Behzad Bordbar and Kamal K. Das, which is hereby incorporated by reference in its entirety as though fully and completely set forth herein.

BACKGROUND

Field

Embodiments described herein generally relate to multifocal ophthalmic lenses, and more particularly, to multifocal diffractive ophthalmic lenses and methods of configuring such lenses.

Description of the Related Art

Ophthalmic lenses, such as intraocular lenses (IOLs) and contact lenses, include single focal length ophthalmic lenses, with a single power, as well as multifocal ophthalmic lenses, with two or more focal lengths. For example, a bifocal ophthalmic lens provides distance and near vision. A trifocal ophthalmic lens provides distance, near, and additionally intermediate vision.

Conventionally, a multifocal ophthalmic lens utilizes diffraction to provide multiple focal lengths with the use of a diffractive structure on a base curve of the surface of the multifocal ophthalmic lens. The diffractive structure typically includes a central zone (also referred to as a central echelette) and a plurality of annular diffractive steps (also referred to as annular echelettes) surrounding the central zone. Annular echelettes are typically designed to have a decreasing radial spacing (i.e., a radial distance between an outer radius and an inner radius of the echelette) towards the edge of the lens, as compared to the radial spacings associated with echelettes that are closer to the center of the lens. The decreasing radial spacing means that very thin echelettes are formed near the edge of the lens. This design requirement poses a variety of manufacturing challenges.

Thus, there is a need for enhanced or next generation (NG) multifocal ophthalmic lenses and methods of configuring thereof.

SUMMARY

Certain embodiments of the present disclosure provide a multifocal ophthalmic lens. The multifocal ophthalmic lens includes a base lens having a base curvature corresponding to a base power, and a diffractive structure comprising a central zone and a plurality of annular echelettes formed on a first surface of the base lens. A radial spacing of each of the plurality of annular echelettes is constant throughout the diffractive structure.

Certain embodiments of the present disclosure also provide a multifocal ophthalmic lens. The multifocal ophthalmic lens includes a base lens having a base curvature corresponding to a base power, and a diffractive structure formed on a first surface of the base lens generating a zero-order diffraction having a distance vision focal point determined by the base power, a first-order diffraction, a second-order diffraction having an intermediate vision focal point, and a third-order diffraction corresponding to a near vision focal point. A diffraction efficiency of the zero-order diffraction is between 35% and 50%, a diffraction efficiency of the first-order diffraction is between 3% and 10%, a diffraction efficiency of the second-order diffraction is between 10% and 15%, and a diffraction efficiency of the third-order diffraction is between 15% and 25%.

Certain embodiments of the present disclosure further provide a method for configuring an ophthalmic lens. The method includes computing a constant radial spacing of each of a central zone and a plurality of annular echelettes, to be formed on the first surface of a base lens, based on a predetermined add power, and forming the plurality of annular echelettes or causing the plurality of annular echelettes to be formed on the ophthalmic lens based on the computed constant radial spacing.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The embodiments described herein provide enhanced or (NG) multifocal lenses, particularly, multifocal ophthalmic lenses, for example, IOLs and contact lenses, and methods for designing the same. The (NG) multifocal lenses and the methods of designing the same, according to the present disclosure, may also be used in conjunction with imaging systems in which adjustment of multifocal points is advantageous, such as cameras, video camera, and mobile phones, as well as systems and devices used during surgical procedures.

Figure 1:
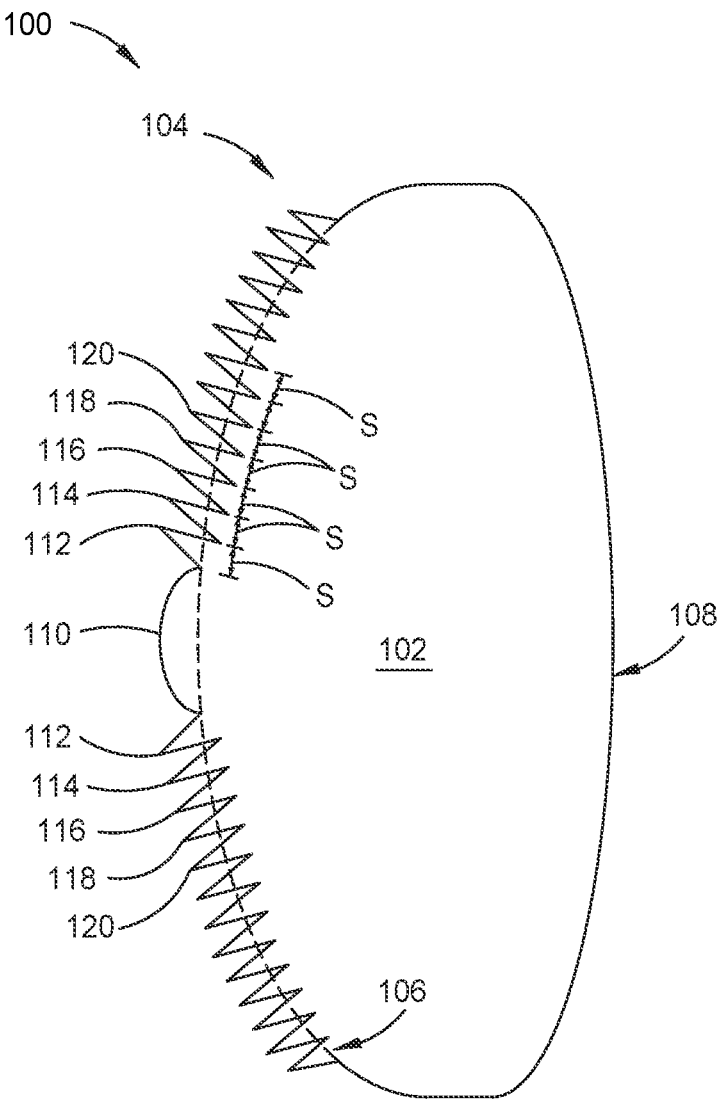
FIG. 1 depicts a cross-sectional view of an example multifocal ophthalmic lens, according to certain embodiments.
Figure 2:
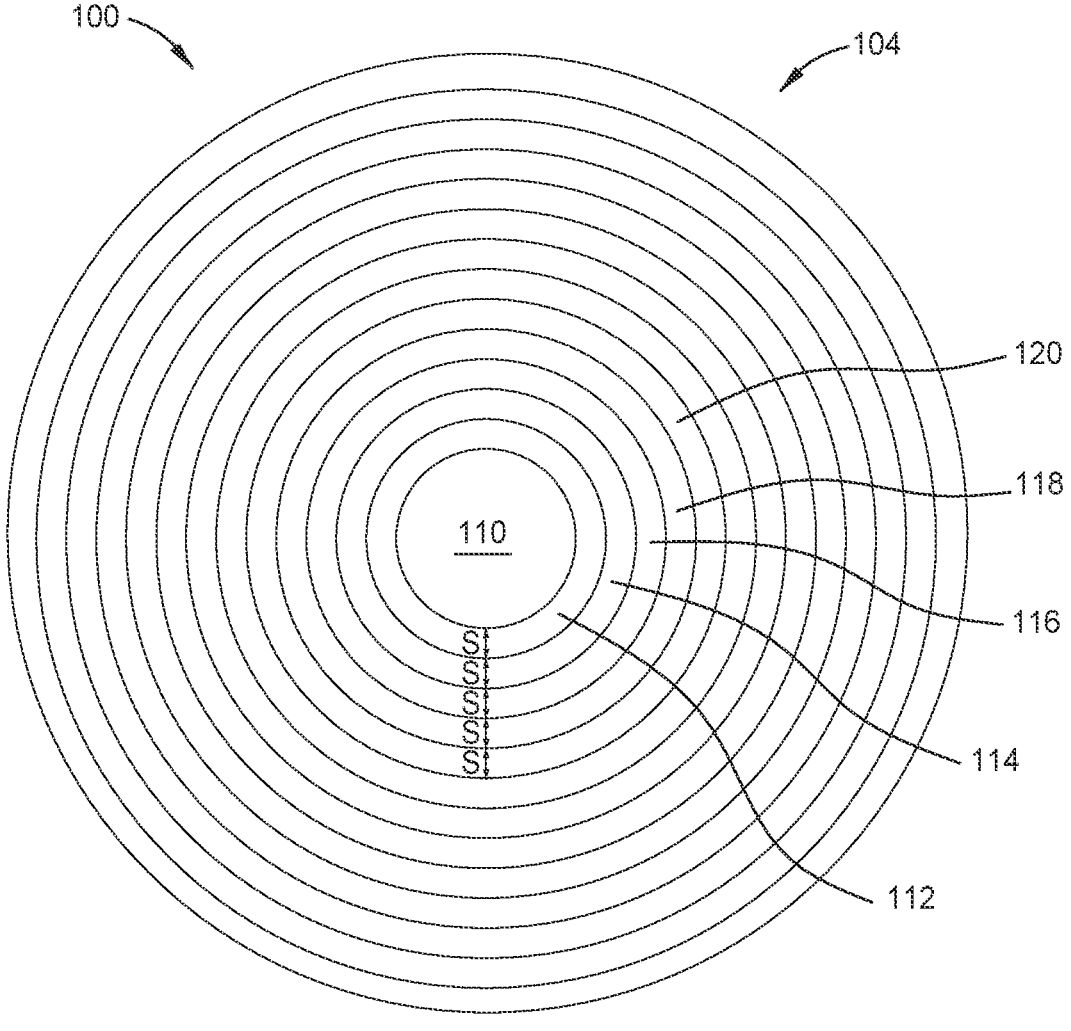
FIG. 2 depicts a top view of the multifocal ophthalmic lens of FIG. 1, according to certain embodiments.

FIG. 1 depicts a cross-sectional view of an example multifocal ophthalmic lens 100, according to certain embodiments. Note that the shape and curvatures of lens 100 are shown for illustrative purposes only and that other shapes and curvatures are also within the scope of this disclosure. FIG. 2 depicts a top view of the multifocal ophthalmic lens 100 of FIG. 1. The multifocal ophthalmic lens 100 includes a base lens 102 having a base curvature, and a diffractive structure 104 formed on the base lens 102 to produce constructive interference in at least four consecutive orders. The base curvature of the base lens 102 determines a base optical power (referred simply to as a "base power" or a "distance power") of the base lens 102, which corresponds to viewing at far distances.

The base lens 102 has an anterior surface 106 and a posterior surface 108. In the example shown in FIG. 1, the anterior surface 106 and the posterior surface 108 have the base curvature, corresponding to the base power. However, in certain other embodiments (not shown), only one of the anterior surface 106 and the posterior surface 108 has the base curvature corresponding to the base power. Further in the example of FIG. 1, the diffractive structure 104 is formed on the anterior surface 106 of the base lens 102. However, in certain other embodiments (not shown), the diffractive structure 104 may be only formed on the posterior surface 108 or both on the anterior surface 106 and the posterior surface 108.

The diffractive structure 104 includes a first central zone (also referred to as a first echelette) 110 at the center of the base lens 102 and a plurality of annular echelettes surrounding the first echelette 110. Each of the echelettes has a sag that refers to a distance from the base curvature of the base lens 102. The sag of each of the annular echelettes increases from the inner radius towards the outer radius thereof. As shown, in FIGS. 1 and 2, the diffractive structure 104 includes thirteen annular echelettes, including a second echelette 112 surrounding the first echelette 110, a third echelette 114 surrounding the second echelette 112, a fourth echelette 116 surrounding the third echelette 114, a fifth echelette 118 surrounding the fourth echelette 116, a sixth echelette 120 surrounding the fifth echelette 118, and so on. Note that the additional annular echelettes are not referred to using reference numbers but are similarly formed according to one or more of the embodiments described herein. Also, note that the thirteen annular echelettes shown in FIGS. 1 and 2 are merely exemplary. In certain embodiments, more than thirteen annular echelettes may be formed. In certain other embodiments, fewer than thirteen annular echelettes may be formed.

In certain embodiments described herein, the annular echelettes are formed such that a radial spacing S (i.e., a radial distance between an inner radius and an outer radius) of each of the annular echelettes is constant (i.e., the same) or at least substantially constant (i.e., at least substantially the same) throughout the diffractive structure 104. In other words, in the example of FIGS. 1 and 2, the radial spacing S of each of the annular echelettes is equal to the radial spacings S of all of the other annular echelettes. In certain embodiments, the radial spacings S of the annular echelettes may be substantially constant (e.g., as opposed to constant) due to manufacturing tolerances. For example, in certain embodiments, the radial spacings S of the annular echelettes may be within 10% of one another.

The diffractive structure 104 divides an incoming optical energy into at least four different focal points corresponding to different diffractive orders. The zero-order diffraction (i.e., direct transmission of the base lens 102) provides a distance vision determined by the base curvature of the base lens 102. In certain embodiments, the first-order diffraction does not correspond to any desired focal point and thus is suppressed to avoid undesirable visual disturbances, such as glare or halos (i.e., unused focal and defocused image superimposed to a used focal image). In certain embodiments, the second-order diffraction and the third-order diffraction provide an intermediate vision focal point and a near vision focal point, respectively. Typically, the intermediate vision focal point may be at a distance of 60 cm, which is within an optimal range for performing tasks using digital screens, and the near vision focal point may be at a distance of 40 cm, which is an ideal distance for reading and other close-range tasks. The distribution of the incoming optical energy (referred to as "diffraction efficiency") to the distance vision, intermediate vision, and near vision focal points can be adjusted by adjusting the configurations of the annular echelettes.

Figure 3:
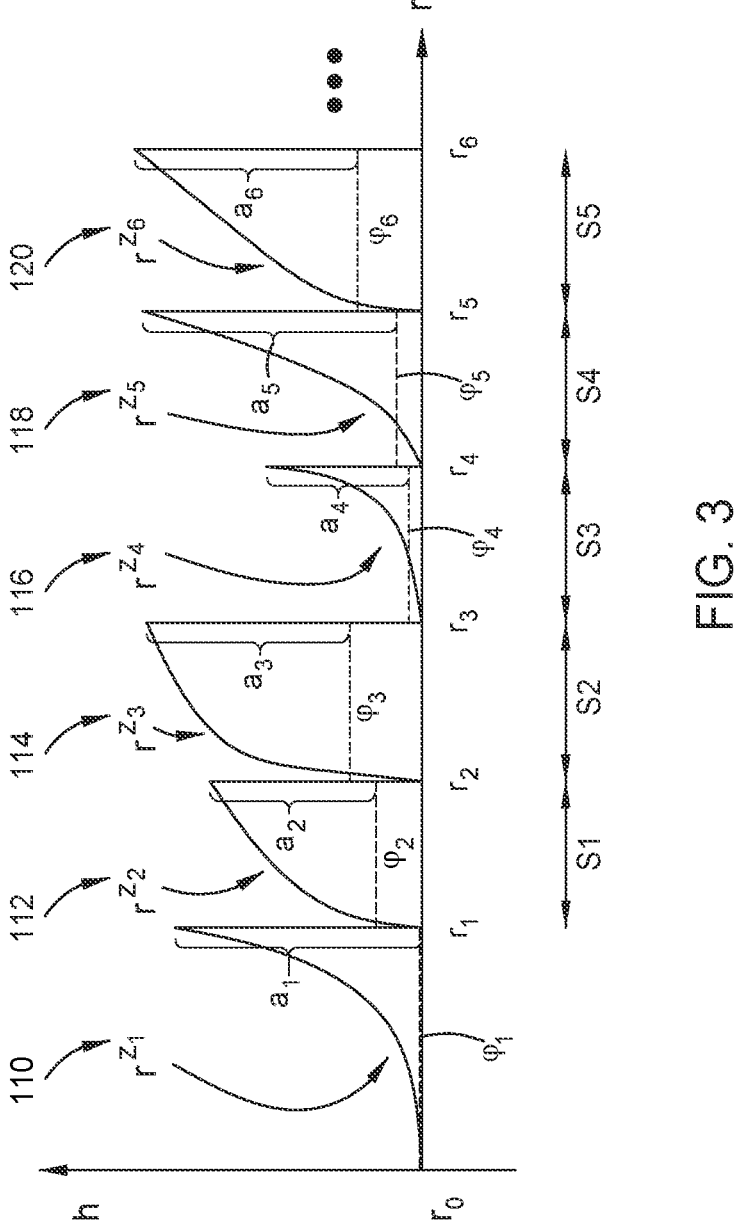
FIG. 3 depicts a side view of a diffractive structure, according to certain embodiments.

In certain embodiments, to provide desired diffraction efficiencies to the distance vision, intermediate vision, and near vision focal points, the radial spacing S and the sag of each of the echelettes may be adjusted. FIG. 3 depicts a side view of an example of the diffractive structure 104. In FIG. 3, the horizontal axis r depicts a radial distance from the center of the first echelette 110 (denoted as $r_0$), and the vertical axis depicts a sag of each of the echelettes. A first radial distance $r_1$ corresponds to an outer radius of the first echelette 110 and an inner radius of the second echelette 112 having a radial spacing $S_1$. A second radial distance $r_2$ corresponds to an outer radius of the second echelette 112 (i.e., $r_2=r_1+S_1$) and an inner radius of the third echelette 114 having a radial spacing $S_2$. A third radial distance $r_3$ corresponds to an outer radius of the third echelette 114 (i.e., $r_3=r_2+S_2$) and an inner radius of the fourth echelette 116 having a radial spacing $S_3$. A fourth radial distance $r_4$ corresponds to an outer radius of the fourth echelette 116 (i.e., $r_4=r_3+S_3$) and an inner radius of the fifth echelette 118 having a radial spacing $S_4$. A fifth radial distance $r_5$ corresponds to an outer radius of the fifth echelette 118 (i.e., $r_5=r_4+S_4$) and an inner radius of the sixth echelette 120 having a radial spacing $S_5$. A sixth radial distance $r_6$ corresponds to an outer radius of the sixth echelette 120 having a radial spacing $S_6$ (i.e., $r_6=r_5+S_5$), and so on. The radial spacings $S_1$, $S_2$, $S_3$, $S_4$, and $S_5$ are all the same or at least substantially the same. Note that although not shown, each of the additional annular echelettes also has a radial spacing S that is the same as $S_1$, $S_2$, $S_3$, $S_4$, and $S_5$, etc.

In some embodiments, the maximum number of annular echelettes that may be formed on the base lens 102 having a diameter $D_{lens}$ is determined by $N=(D_{lens}-2r_1)/S$. In some embodiments, the constant radial spacing S of the annular echelettes is between about $1/60^{th}$ and about $1/20^{th}$ of the diameter $D_{lens}$ of the base lens 102. The diameter $D_{lens}$ of the base lens 102 is typically between about 3 mm and about 10 mm. In certain embodiments, an area of the diffractive structure 104 may be between about 40% and 100% of a surface area of the base lens 102.

In designing the diffractive structure 104 (an example of which is shown in FIG. 3) to provide the desired diffraction efficiencies, the first radial distance $r_1$ (i.e., the radius of the first echelette 110) is first determined. For a given add power $D_{add}$ at the near vision focal point, the first radial distance $r_1$ is determined as $$r_1 = \sqrt{2\lambda/D_{add}}$$

where $\lambda$ is a design wavelength. In certain embodiments, the second radial distance $r_2$ (i.e., the outer radius of the second echelette 112) is set as a summation of a constant radial spacing S and the first radial distance $r_1$, $r_2=S+r_1$. For further radial distances $r_j$ (j=3, 4, . . . ), a difference between two adjacent radial distances $r_{j-1}$—and $r_j$ is set to be equal to the constant radial spacing S, thus the j-th radial distance (j=2, 3, . . . ) is set as $=(j-1)r_2-(j-2)r_1=(j-1)S+r_1$.

Sag $h_j$ of the j-th annular echelette (j=1, 2, 3, . . . ) relative to the base curvature of the base lens 102 may vary from the j−1-th radial distance to the (j)-th radial distance $r_j$. The sag $h_j$ of the j-th echelette (j=1,2,3, . . . ) may be calculated based on a polynomial function (with a degree $z_j$) with respect to a radial distance r between the radial distance $r_{j-1}$ and $r_j$. For example, in certain embodiments, the sag $h_j$ may be defined as $$h_j = \frac{a_j}{(r_j - r_{j-1})}(r^{z_j} - r_{j-1}) + \varphi_j,$$

where $z_j$ is a positive number greater than or equal to 1 ($z_j \geq 1$), or $$h_j = \frac{-a_j}{(r_j - r_{j-1})}(r^{z_j} + r_{j-1}) + \varphi_j$$

where $z_j$ is a negative number ($z_j$<0). In the example function above, $a_j$ corresponds to a step height of the j-th echelette and $\varphi_j$ corresponds to a phase delay of the j-th echelette. Thus, the step height $a_j$ of the j-th echelette, the phase delay $\varphi_j$ of the j-th echelette, the degree $z_j$ of the polynomial function of the sag $h_j$ of the j-th echelette, and the constant radial spacing S of the annular echelettes can be adjusted as control parameters to provide desired diffraction efficiencies to the distance vision, intermediate vision, and the near vision focal points. In certain embodiments, the control parameters, the step height $\alpha_j$, the phase delay $\varphi_j$, the degree $z_j$ of the polynomial function of the sag $h_j$ can be all different for different echelettes. In some embodiments, the step height $\alpha_j$ of the j-th echelette is between about 0.25 and about 0.7 in the unit of the design wavelength $\lambda$, the phase delay $\varphi_j$ of the j-th echelette is between about −1.0 and about 1.0 in the unit of the design wavelength $\lambda$, and the sag $h_j$ of the j-th echelette is between about −1.0 and about 1.0 in the unit of the design wavelength $\lambda$.

Table I shows an example set of the control parameters $\alpha_j$, $\varphi_j$, $z_j$, and S of a diffractive structure 104 as shown in FIG. 3 ($S=S_1=S_2=S_3=S_4=S_5$) for the add power $D_{add}$=3.25D. With this example set of the control parameters $\alpha_j$, $\varphi_j$, $z_j$, and S, diffraction efficiency of the zero-order diffraction (i.e., the distance vision focal point) is between 35% and 50%, diffraction efficiency of the first order diffraction is suppressed to less than about 10%, for example, between 3% and 10%, diffraction efficiency of the third order diffraction (i.e., the intermediate vision focal point) is between 10% and 15%, and diffraction efficiency of the fourth order diffraction (i.e., the near vision focal point) is between 15% and 25%.

and constant radial spacing throughout a diffractive structure thereof. As shown, the system 400 includes, without limitation, a control module 402, a user interface display 404, an interconnect 408, an output device 410, and at least one I/O device interface 412, which may allow for the connection of various I/O devices (e.g., keyboards, displays, mouse devices, pen input, etc.) to the system 400.

The control module 402 includes a central processing unit (CPU) 414, a memory 416, and a storage 418. The CPU 414 may retrieve and execute programming instructions stored in the memory 416. Similarly, the CPU 414 may retrieve and store application data residing in the memory 416. The interconnect 408 transmits programming instructions and application data, among CPU 414, the I/O device interface 412, the user interface display 404, the memory 416, the storage 418, output device 410, etc. The CPU 414 can represent a single CPU, multiple CPUs, a single CPU having multiple processing cores, and the like. Additionally, in certain embodiments, the memory 416 represents a random access memory. Furthermore, in certain embodiments, the storage 418 may be a disk drive. Although shown as a single unit, the storage 418 may be a combination of fixed or removable storage devices, such as fixed disc drives, removable memory cards or optical storage, network attached storage (NAS), or a storage area-network (SAN).

As shown, the storage 418 includes input parameters 420. The input parameters 420 include an add power $D_{add}$, a diameter $D_{lens}$ of the base lens 102, and desired diffraction efficiencies. The memory 416 includes a control parameter computing module 422 for computing the step height $\alpha_j$ of the j-th echelette, the phase delay $\varphi_j$ of the j-th echelette, the degree $z_j$ of the polynomial variation in the sag $h_j$ of the j-th echelette, and the constant radial spacing S of the echelettes (e.g., the first echelette 110 and the annular echelettes 112, 114, 116, 118, and 120) such that the desired diffraction efficiencies can be provided. In addition, the memory 416 includes input parameters 424.

In certain embodiments, input parameters 424 correspond to input parameters 420 or at least a subset thereof. In such embodiments, during the computation of the control parameters $a_j$, $\varphi_j z_j$, and S, the input parameters 424 are retrieved from the storage 418 and executed in the memory 416. In such an example, the control parameter computing module 422 comprises executable instructions (e.g., including one or more of the formulas described herein) for computing the control parameters $\alpha_j$, $\varphi_j z_j$, and S based on the input parameters 424. In certain other embodiments, input parameters 424 correspond to parameters received from a user through user interface display 404. In such embodiments, the control parameter computing module 422 comprises executable

TABLE I

| Echelette | 1 | 2 | 3 | 4 | 5 | 6 | 7 | 8 | 9 | 10 |
|---|---|---|---|---|---|---|---|---|---|---|
| $a_j$ (in unit of $\lambda$) | 0.5923 | 0.3423 | 0.2699 | 0.5542 | 0.4395 | 0.2796 | 0.6986 | 0.4486 | 0.2654 | 0.6458 |
| $\varphi_j$ (in unit of $\lambda$) | −0.1218 | 0.2062 | −0.1039 | −0.1475 | 0.2134 | 0.0968 | −0.0182 | 0.2856 | 0.0284 | −0.0575 |
| $z_j$ (in unit of $\lambda$) | 2.021 | 2.269 | 32.324 | 5.893 | −8.73 | 35.079 | 11.822 | −6.256 | 53.991 | −19.52 |
| $r_j$ (mm) | 0.581774 | 0.781774 | 0.981774 | 1.1181774 | 1.381774 | 1.581774 | 1.781774 | 1.981774 | 2.181774 | 3.181774 |

Figure 4:
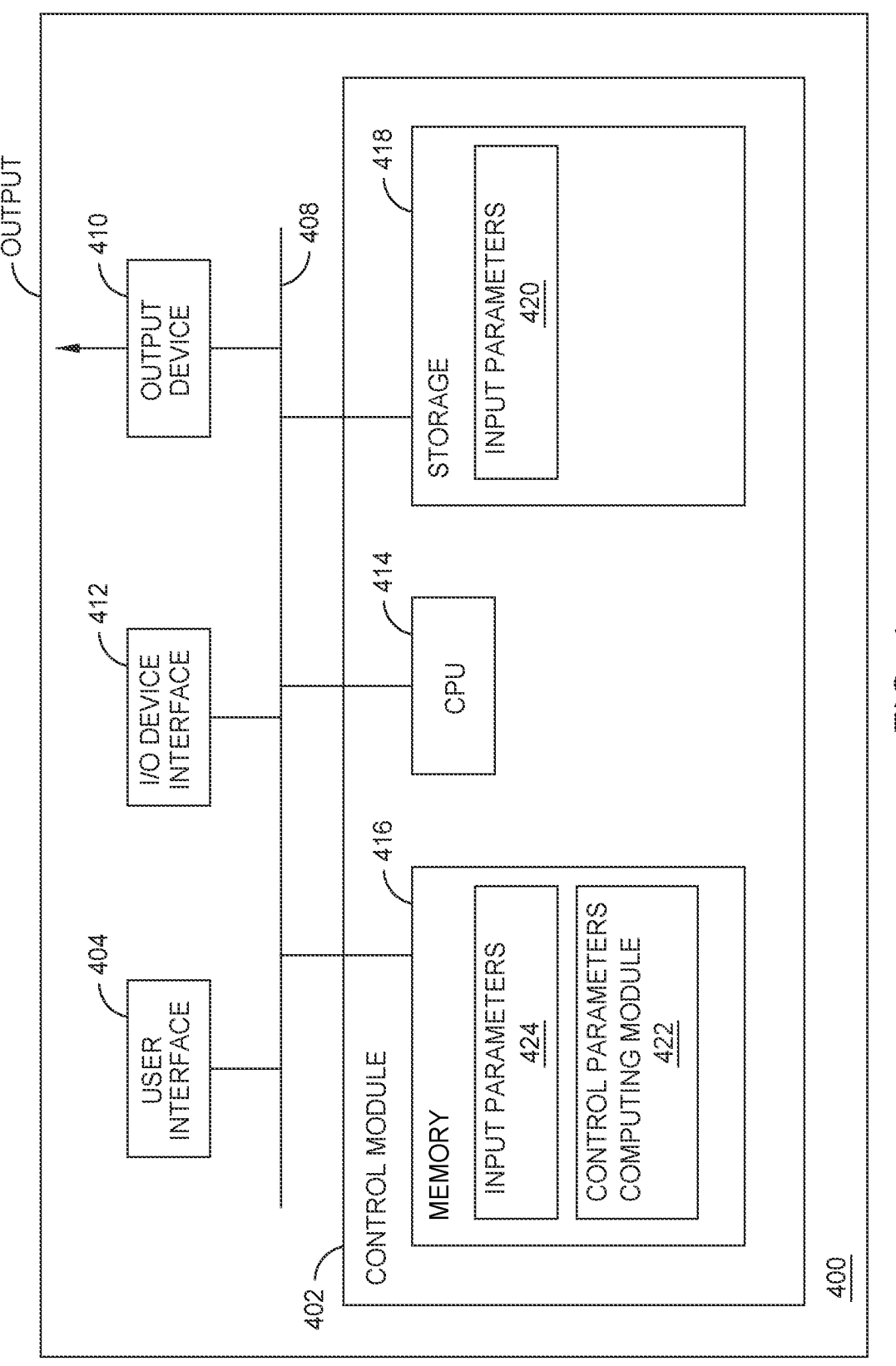
FIG. 4 depicts an exemplary system for designing a multifocal ophthalmic lens, according to certain embodiments.

FIG. 4 depicts an exemplary system 400 for designing, configuring, and/or forming a multifocal ophthalmic lens 100 with a central zone and a plurality of annular echelettes instructions for computing the control parameters $\alpha_j$, $\varphi_j$, $z_j$, and S based on information received from the user interface display 404.

In certain embodiments, the computed control parameters $\alpha_j$, $\varphi_j$, $z_j$, and S are output via the output device 410 to a lens manufacturing system that is configured to receive the control parameters and form a lens accordingly. In certain other embodiments, system 400 itself is representative of at least a part of a lens manufacturing systems. In such embodiments, the control module 402 then causes hardware components (not shown) of system 400 to form the lens according to the control parameters. The details and operations of a lens manufacturing system are known to one of ordinary skill in the art and are omitted here for brevity.

Figure 5:
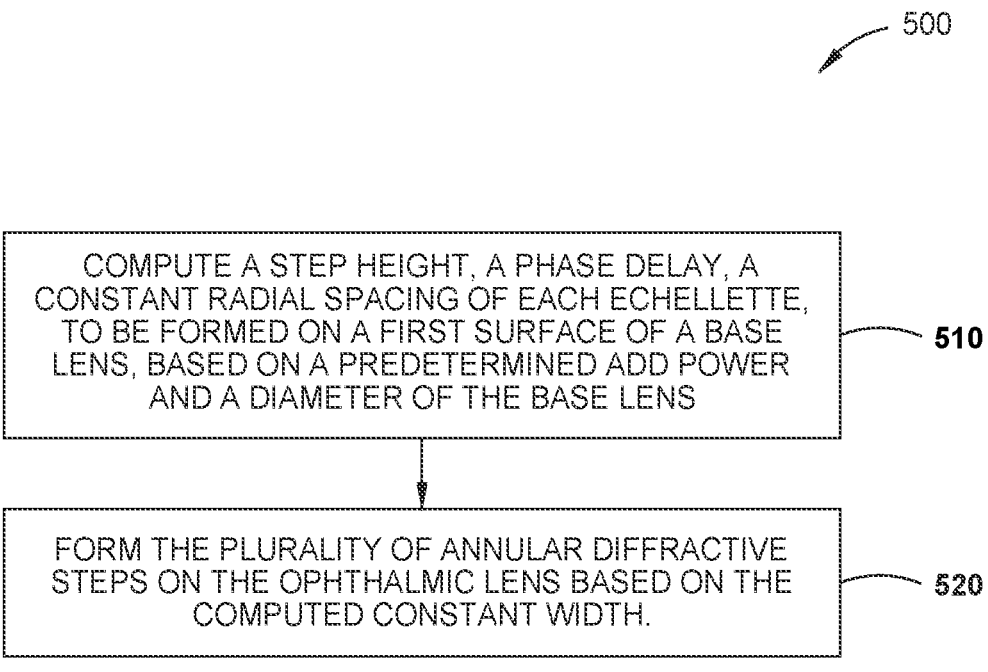
FIG. 5 depicts example operations for forming a multifocal ophthalmic lens, according to certain embodiments.

FIG. 5 depicts example operations 500 for forming a multifocal ophthalmic lens 100 with a plurality of annular echelettes having a constant radial spacing throughout. In some embodiments, the step 510 of operations 500 is performed by one system (e.g., the system 400) while step 520 is performed by a lens manufacturing system. In some other embodiments, both steps 510 and 520 are performed by a lens manufacturing system.

At step 510, control parameters (i.e., the step height $\alpha_j$ of the j-th echelette, the phase delay $\varphi_j$ of the j-th echelette, the degree $z_j$ of the polynomial variation in the sag $h_j$ of the j-th echelette, and the constant radial spacing S of the annular echelettes 112, 114, 116, 118, and 120) are computed based on input parameters (i.e., an add power $D_{add}$, a diameter $D_{lens}$ of the base lens 102, the number of annular echelettes to be formed, and desired diffraction efficiencies) such that the desired diffraction efficiencies can be provided. The computations performed at step 510 are based on one or more of the embodiments, including the formulas, described herein.

At step 520, a multifocal ophthalmic lens 100 having a diffractive structure 104 based on the computed control parameters is formed, using appropriate methods, systems, and devices typically used for manufacturing lenses, as known to one of ordinary skill in the art.

The embodiments described herein provide improved multifocal ophthalmic lenses having evenly spaced annular echelettes. In configuring such multifocal ophthalmic lenses, a variety of control parameters, such as radial spacings, step heights, sags, and phase delays of the echelettes can be adjusted such that desired diffraction efficiencies with respect to the distance vision, intermediate vision, and the near vision focal points are provided. In certain embodiments, utilizing the methods and techniques described herein may help form multifocal ophthalmic lenses that comprise a fewer number of echelettes as compared to certain existing multifocal ophthalmic lenses formed using existing techniques. In certain embodiments, a fewer number of echelettes lead to a reduction in visual disturbances, such as halo.

While the foregoing is directed to embodiments of the present disclosure, other and further embodiments of the disclosure may be devised without departing from the basic scope thereof, and the scope thereof is determined by the claims that follow.

The invention claimed is:

1. A multifocal ophthalmic lens, comprising:

a base lens having a base curvature corresponding to a base power; and a diffractive structure formed on a first surface of the base lens and comprising:

a central zone comprising a first echelette at a center of the diffractive structure; and a plurality of annular echelettes surrounding the first echelette, wherein a radial spacing of each of the plurality of annular echelettes is constant throughout the diffractive structure, and wherein at least two echelettes of the plurality of annular echelettes have different sag profiles relative to each other.

2. The multifocal ophthalmic lens of claim 1, wherein: the first surface is an anterior surface of the multifocal ophthalmic lens.

3. The multifocal ophthalmic lens of claim 1, wherein: the first surface is a posterior surface of the multifocal ophthalmic lens.

4. The multifocal ophthalmic lens of claim 1, wherein: the constant radial spacing of the each of the plurality of annular echelettes is between $\frac{1}{60}$ and $\frac{1}{20}$ of a diameter of the base lens.

5. The multifocal ophthalmic lens of claim 1, wherein: a sag of each of the central zone and the plurality of annular echelettes is between $-1.0$ and $1.0$ in a unit of a design wavelength.

6. The multifocal ophthalmic lens of claim 5, wherein: a phase delay of each of the central zone and the plurality of annular echelettes is between $-1.0$ and $1.0$ in the unit of the design wavelength.

7. The multifocal ophthalmic lens of claim 1, wherein: a sag of each of the central zone and the plurality of annular echelettes from the first surface of the base lens varies from an inner radius to an outer radius thereof polynomially with respect to a radial distance r from the inner radius.

8. The multifocal ophthalmic lens of claim 1, wherein: a sag of the j-th echelette (j=1, 2, 3, . . . ) from the first surface of the base lens varies from an inner radius $r_{j-1}$ to an outer radius $r_j$ polynomially with respect to a radial distance r from the inner radius $r_{j-1}$ as $$h_j = \frac{a_j}{(r_j - r_{j-1})}(r^{z_j} - r_{j-1}) + \varphi_j, z_j$$

being a positive number greater than or equal to $1 (z_j \geq 1)$, or $$h_j = \frac{-a_j}{(r_j - r_{j-1})}(r^{z_j} + r_{j-1}) + \varphi_j, z_j$$

being a negative number $(z_j < 0)$, wherein:

the first echelette is the central zone, the plurality of annular echelettes are j-th echelettes (j=2, 3, . . . ), $\alpha_j$ is a step height of the j-th echelette, and $\varphi_j$ corresponds to a phase delay of the j-th echelette.

9. A multifocal ophthalmic lens, comprising:

a base lens having a base curvature corresponding to a base power; and a diffractive structure formed on a first surface of the base lens generating a zero-order diffraction having a distance vision focal point determined by the base power, a first-order diffraction, a second-order diffraction having an intermediate vision focal point, and a third-order diffraction corresponding to a near vision focal point, wherein:

the diffractive structure comprises a central zone comprising a first echelette at a center of the diffractive structure and a plurality of annular echelettes surrounding the first echelette, at least two echelettes of the plurality of annular echelettes have different sag profiles relative to each other, a radial spacing of each of the plurality of annular echelettes is constant throughout the diffractive structure, diffraction efficiency of the zero-order diffraction is between 35% and 50%, diffraction efficiency of the first-order diffraction is between 3% and 10%, diffraction efficiency of the second-order diffraction is between 10% and 15%, and diffraction efficiency of the third-order diffraction is between 15% and 25%.

10. The multifocal ophthalmic lens of claim 9, wherein:

the first surface is an anterior surface of the multifocal ophthalmic lens, or a posterior surface of the multifocal ophthalmic lens.

11. The multifocal ophthalmic lens of claim 9, wherein:

the constant radial spacing of each of the plurality of annular echelettes is between $\frac{1}{60}$ and $\frac{1}{20}$ of a diameter of the base lens.

12. The multifocal ophthalmic lens of claim 11, wherein:

a sag of each of the central zone and the plurality of annular echelettes is between −1.0 and 1.0 in a unit of a design wavelength, and a phase delay of each of the central zone and the plurality of annular echelettes is between −1.0 and 1.0 in the unit of the design wavelength.

13. The multifocal ophthalmic lens of claim 11, wherein:

a sag of each of the central zone and the plurality of annular echelettes from the first surface of the base lens varies from an inner radius to an outer radius thereof polynomially with respect to a radial distance r from the inner radius.

14. A method for configuring an ophthalmic lens, comprising:

computing a constant radial spacing for each of a plurality of annular echelettes, to be formed on a first surface of a base lens, based on a predetermined add power, wherein:

the base lens comprises a central zone comprising a first echelette at a center of the base lens, and the plurality of annular echelettes surround the first echelette, at least two echelettes of the plurality of annular echelettes have different sag profiles relative to each other, and forming the plurality of annular echelettes or causing the plurality of annular echelettes to be formed on the ophthalmic lens based on the computed constant radial spacing.

15. The method of claim 14, further comprising:

computing a sag for each of the central zone and the plurality of annular echelettes such that diffraction efficiency of a zero-order diffraction is between 35% and 50%, diffraction efficiency of a first-order diffraction is between 3% and 10%, diffraction efficiency of a second-order diffraction is between 10% and 15%, and diffraction efficiency of a third-order diffraction is between 15% and 25%, wherein the forming is further based on the computed sag of each of the central zone and the plurality of annular echelettes.

16. The method of claim 14, wherein:

the first surface is an anterior surface of the multifocal ophthalmic lens, or a posterior surface of the multifocal ophthalmic lens.

17. The method of claim 14, wherein:

the constant radial spacing of each of the plurality of annular echelettes is between $\frac{1}{60}$ and $\frac{1}{20}$ of a diameter of the base lens.

18. The method of claim 14, wherein:

a sag of each of the central zone and the plurality of annular echelettes is between −1.0 and 1.0 in a unit of a design wavelength, and a phase delay of each of the central zone and the plurality of annular echelettes is between −1.0 and 1.0 in the unit of the design wavelength.

19. The method of claim 14, wherein:

a sag of each of the central zone and the plurality of annular echelettes from the first surface of the base lens varies from an inner radius to an outer radius thereof polynomially with respect to a radial distance r from the inner radius.

20. The multifocal ophthalmic lens of claim 1, wherein the central zone comprises a single first echelette at the center of the diffractive structure.

* * * * *